United States Patent [19]
Yoshimi et al.

[11] Patent Number: 5,245,456
[45] Date of Patent: Sep. 14, 1993

[54] BIREFRINGENT FILM WITH $N_x > N_z > N_y$, PROCESS FOR PRODUCING THE SAME, RETARDATION FILM, ELLIPTICALLY POLARIZING PLATE, AND LIQUID CRYSTAL DISPLAY

[75] Inventors: Hiroyuki Yoshimi; Tatsuki Nagatsuka; Yasuo Fujimura; Tatsuya Osuka, all of Osaka, Japan

[73] Assignee: Nitto Denko Corporation, Osaka, Japan

[21] Appl. No.: 780,938

[22] Filed: Oct. 23, 1991

[30] Foreign Application Priority Data

Oct. 24, 1990 [JP] Japan .................. 2-286646
Oct. 7, 1991 [JP] Japan .................. 3-287174

[51] Int. Cl.$^5$ .................. G02F 1/1333; G02B 5/30
[52] U.S. Cl. .................. 359/73; 359/494; 359/500
[58] Field of Search .................. 359/73, 494, 500

[56] References Cited

U.S. PATENT DOCUMENTS

| | | | |
|---|---|---|---|
| 5,042,924 | 8/1991 | Terasaki et al. | 359/494 |
| 5,093,739 | 3/1992 | Aida et al. | 359/73 |
| 5,179,456 | 1/1993 | Aizawa et al. | 359/73 |

FOREIGN PATENT DOCUMENTS

| | | | |
|---|---|---|---|
| 0112488 | 7/1984 | European Pat. Off. | |
| 0297841 | 1/1989 | European Pat. Off. | 359/73 |
| 0367288 | 5/1990 | European Pat. Off. | |
| 0382460 | 8/1990 | European Pat. Off. | |
| 0096623 | 4/1989 | Japan | 359/73 |
| 0253230 | 10/1990 | Japan | 359/73 |

OTHER PUBLICATIONS

Patent Abstracts of Japan, vol. 14, No. 289 (P-1065), Jun. 21, 1990, Abstract of JP-2089006, published Mar. 29, 1990.

*Primary Examiner*—William L. Sikes
*Assistant Examiner*—Anita Pellman Gross
*Attorney, Agent, or Firm*—Sughrue, Mion, Zinn, Macpeak & Seas

[57] ABSTRACT

A birefringent film in which molecules oriented in a direction parallel to the film plane and molecules oriented in the direction of the thickness of the film are present in a mixed state. Also, a process for producing the birefringent film, which comprises laminating a resin film on one or both sides thereof with a shrinkable film, thereby preparing a laminate, and then heat stretching the laminate, thereby performing stretching treatment of the resin film while imparting to the resin film the ability to shrink in the direction crossing the stretching direction. A retardation film is formed by using at least one birefringent film and has refractive indexes, $n_x$ and $n_y$, in two directions parallel to the plate plane and crossing each other at right angles and a refractive index, $n_z$, in the direction of the thickness of the plate, said refractive indexes $n_x$, $n_y$, and $n_z$ satisfying the following equation:

$$0 < (n_x - n_z)/(n_x - n_y) < 1$$

provided that $n_x > n_y$. Also, an elliptically polarizing plate comprises a laminate of the retardation film with a polarizing plate. Additionally, a liquid crystal display comprises a liquid crystal cell and a polarizing plate disposed at least on one side of said liquid crystal cell through the retardation film.

11 Claims, 1 Drawing Sheet

BIREFRINGENT FILM WITH $N_x > N_z > N_y$, PROCESS FOR PRODUCING THE SAME, RETARDATION FILM, ELLIPTICALLY POLARIZING PLATE, AND LIQUID CRYSTAL DISPLAY

FIELD OF THE INVENTION

The present invention relates to a birefringent film suitable for the compensation of birefringence, and a process for producing the film. The present invention further relates to a retardation film, elliptically polarizing plate, and liquid crystal display, all using the above birefringent film.

BACKGROUND OF THE INVENTION

High-contrast liquid crystal displays utilizing advantages of the birefringent properties of liquid crystals of the STN type and other types are being used as the displays of personal computers, word processors, and others. Such liquid crystal displays have a problem that since incident light is converted to linearly polarized light by the polarizing plate and then to elliptically polarized light due to the birefringence of the liquid crystal cell, the display assumes a yellow to blue color when the elliptically polarized light is viewed through the polarizing plate. As an expedient for reconverting elliptically polarized light which has passed through a liquid crystal cell to linearly polarized light by compensating the phase difference caused by the birefringence of the liquid crystal cell thereby to eliminate the above-described coloring problem, an FTN-type display has been proposed in which a retardation film comprising an oriented film is provided between a liquid crystal cell and a polarizing plate.

Use of an ordinary oriented film as the retardation film in the above FTN-type display, however, has proved to be defective in visibility and recognizability because the viewing angle range in which the display can be viewed as a black-and-white display is narrow since the display assumes a yellow to blue color if the viewing point shifts only little and because the viewing angle range in which the display can be viewed with good contrast is also narrow. Retardation films which have controlled refractive indexes in the thickness direction and can attain widened viewing angle ranges have been proposed in JP-A-2-47629 and JP-A-2-160204. (The term "JP-A" as used herein means an "unexamined published Japanese patent application".)

However, the retardation film proposed in JP-A-2-47629, which is obtained by monoaxially stretching a film made of a resin showing negative birefringence, i.e., having a reduced refractive index in the stretch direction, has a problem that because of the limited kinds of such resins showing negative birefringence, the range of the selection of refractive indexes for controlling reflection loss caused at the interface between the retardation film and a glass plate or the like is considerably limited, and also has another problem that a sufficiently large difference in refractive index between respective directions cannot be attained by the stretching treatment.

On the other hand, the retardation film proposed in JP-A-2-160204, which is obtained by slicing an extruded rod and stretching the sliced plate in which the molecules are oriented in the thickness direction, has been defective in that the production efficiency therefor is low. This technique further has a problem that it is difficult to obtain a large-sized retardation film applicable, for example, to large liquid crystal displays for high definition television, etc.

SUMMARY OF THE INVENTION

An object of the present invention is to provide a birefringent film which can be easily produced from a resin selected from a wide variety of resins even when the birefringent film is large-sized, and which has a large refractive index difference between different directions. Such birefringent films can be made to have various refractive indexes.

Another object of the present invention is to provide a process for producing the above birefringent film.

Still another object of the present invention is to provide a retardation film or elliptically polarizing plate which can compensate in a wide range of viewing angles.

A further object of the present invention is to provide a liquid crystal display having excellent visibility and recognizability.

The present invention provides, in one embodiment thereof, a birefringent film in which molecules oriented in a direction parallel to the film plane and molecules oriented in the direction of the thickness of the film are present in a mixed state.

In another embodiment of the present invention, a process for producing the above birefringent film is provided which comprises laminating a resin film on one or both sides thereof with a shrinkable film, thereby preparing a laminate, and then heat stretching the laminate, thereby performing stretching treatment of the resin film while imparting to the resin film the ability to shrink in the direction crossing the stretching direction.

In still another embodiment of the present invention, a retardation film is provided which uses at least one birefringent film of the above kind and has refractive indexes, $n_x$ and $n_y$, in two directions parallel to the plate plane and crossing each other at right angles and a refractive index, $n_z$, in the direction of the thickness of the plate, the refractive indexes $n_x$, $n_y$, and $n_z$ satisfying the following equation:

$$0 < (n_x - n_z)/(n_x - n_y) < 1$$

provided that $n_x > n_y$.

In a further embodiment of the present invention, an elliptically polarizing plate is provided which comprises a laminate of the above retardation film with a polarizing plate.

In still a further embodiment of the present invention, a liquid crystal display is provided which comprises a liquid crystal cell and a polarizing plate disposed at least on one side of the liquid crystal cell through the above retardation film.

The birefringent film in which molecules oriented in the stretch direction and molecules oriented in the thickness direction are present in a mixed state can be obtained by laminating a resin film on one or both sides thereof with a shrinkable film, thereby preparing a laminate, and then heat stretching the laminate, thereby performing stretching treatment of the resin film while imparting thereto the ability to shrink in the direction crossing the stretching direction. Using this birefringent film containing molecules oriented in the thickness direction, the retardation film can be obtained which satisfies $0 < (n_x - n_z)/(n_x - n_y) < 1$, provided that $n_x > n_y$.

Since in this retardation film phase difference changes little with viewing angle, it can be applied to birefringent liquid crystal cells to heighten their contrast and widen their black-and-white display range to thereby attain improved visibility and recognizability.

DETAILED DESCRIPTION OF THE INVENTION

Figure 1:
FIG. 1 is a sectional view of one embodiment of the retardation film according to the present invention.

In the birefringent film of the present invention, molecules oriented in a direction parallel to the film plane and molecules oriented in the direction of the thickness of the film are present in a mixed state. This birefringent film can be produced by, for example, a stretching treatment in which a resin film to be stretched is laminated on one or both sides thereof with a shrinkable film, thereby preparing a laminate, and the laminate is then heat stretched, thereby stretching the resin film while imparting thereto the ability to shrink in the direction crossing the stretching direction.

The resin film to be subjected to the stretching treatment may be formed by a proper technique such as casting, extrusion, or the like. Although the film may be made of a resin showing either positive birefringence or negative birefringence, the resin is preferably a resin which gives films having excellent transparency. The thickness of the resin film is not particularly limited, but it is generally from 10 to 500 μm, preferably from 20 to 200 μm. The resin showing positive birefringence is a resin which has an increased refractive index in the stretch direction (has a slow axis parallel to the direction of molecular orientation), in contrast to the resin showing negative birefringence as described hereinabove.

Examples of the resin showing positive birefringence include general-purpose resins such as polycarbonates, poly(vinyl alcohol), cellulose acetate, polyesters, polyarylates, polyimides, and polyolefins. Of these, amorphous and transparent thermoplastic resins and aromatic polycarbonates are preferably used.

Examples of the resin showing negative birefringence include polystyrene, styrene-based copolymers, poly(methyl methacrylate), methyl methacrylate-based copolymers, and the like. Preferably used of these are polystyrene and styrene-based copolymers such as styrene-acrylonitrile copolymers, styrene-methacrylic acid copolymers, styrene-methyl methacrylate copolymers, styrene-butadiene copolymers, and styrene-maleic anhydride copolymers.

In order to impart to the resin film the ability to shrink in the width direction during stretching of the film, the following method is, for example, used. That is, the resin film to be stretched is laminated on one or both sides thereof with a shrinkable film during heat stretching. The resulting laminate is then heat stretched. Thus, during this stretching treatment, the shrinking force of the shrinkable film in the direction crossing the stretching direction causes the resin film to have a stretching stress in the direction of the thickness of the resin film.

By such a stretching treatment in which stretching force is applied to the resin film also in the thickness direction and, as a result, the resin film comes to contain molecules oriented in the thickness direction together with molecules oriented in a direction parallel to the film plane, a birefringent film satisfying $0 < (n_x - n_z)/(n_x - n_y) < 1$ (hereinafter $(n_x - n_z)/(n_x - n_y)$ is referred to as $N_z$) can be obtained even where the resin constituting the film shows either positive or negative birefringence.

If the above stretching treatment of a resin film is conducted in a manner such that the resin film is merely stretched without using a shrinkable film, a birefringent film satisfying $0 < N_z < 1$ cannot be obtained for the following reason. In the case of a positive birefringent resin (in which $n_x > n_y$ where $n_x$ is the refractive index in the stretch direction), monoaxial stretching results in $N_z = 1$ and biaxial orientation results in $N_z > 1$; in the case of a negative birefringent resin (in which $n_x < n_y$ where $n_x$ is the refractive index in the stretch direction), monoaxial stretching results in $N_z = 0$ and biaxial orientation results in $N_z < 0$.

Examples of the shrinkable film used to impart to the resin film the ability to shrink in the width direction during stretching include films of various resins which have been biaxially stretched or stretched monoaxially in one direction. Preferably used of these are stretched films which are made of resins such as polyesters, polystyrene, polyethylene, polypropylene, poly(vinyl chloride), and poly(vinylidene chloride) and which have sufficient heat shrinkability, i.e., have a degree of width-direction or lengthwise direction shrinkage higher than that of the resin film by at least 5%, preferably 10% or more.

Laminating of the shrinkable film to the resin film can be conducted by a suitable means which produces peelable laminates. For example, the tackiness of the film itself or a pressure-sensitive adhesive may be utilized. In producing the desired birefringent film, control of the ratio of the molecules oriented in a direction parallel to the film plane to the molecules oriented in the thickness direction and control of the refractive indexes can be attained by controlling the degree of width-direction shrinkage of the shrinkable film during heat stretching. In the case where the thus-produced birefringent film is for use in or as a retardation film, the shrinkable film is normally peeled off before practical use of the birefringent film.

Figure 2:
FIG. 2 is a sectional view of another embodiment of the retardation film according to the present invention.

The retardation film according to the present invention is prepared using at least one birefringent film described above in a manner such that the retardation film satisfies $0 < N_z < 1$ provided that $n_x > n_y$, that is, it satisfies $n_x > n_z > n_y$. Therefore, the retardation film (3) may be of a single-layer structure comprising a birefringent film 1 as shown in FIG. 1, or may be a laminate of two birefringent films 1 as shown in FIG. 2. In the latter case, the combined two birefringent films may have the same $N_z$ or may have different $N_z$ values. In FIG. 2, numeral 2 denotes a transparent adhesive layer.

The retardation film may alternatively be a laminate of a birefringent film 1 of the above-described kind which satisfies $0 < N_z < 1$ with an ordinary oriented film ($N_z \geq 1$, $N_z \leq 0$) which has been produced by monoaxial stretching, biaxial orientation, or the like and has an uncontrolled refractive index in the thickness direction.

In producing such a retardation film, the phase differences caused by the respective films can be superimposed or controlled based on the angle at which the light axes of the birefringent film and oriented film cross each other. In this case, although the number of laminated films including the birefringent film is not particularly limited, smaller numbers are advantageous from the standpoints of reducing the reflection loss of light and diminishing transmittance decrease. In general, the number of laminated films is from 2 to 3.

Laminating a birefringent film with other film(s) may be conducted in a manner such that the light axes of the respective films cross each other at an angle of about 30° or less thereby to control optical rotation, etc. The birefringent film and other film(s) for use in producing the retardation film may be protected or reinforced, for example, with a resin or glass layer which is isotropic and transparent.

A transparent adhesive or transparent pressure-sensitive adhesive of, for example, the acrylic type or the like may be used in laminating a birefringent film with other film(s). Such adhesive materials are not particularly limited in kind. However, adhesive materials which can be cured or dried without the necessity of high-temperature heating or long-term treatment are preferred from the standpoint of preventing the birefringent film and other film(s) from suffering an optical property change. If two films having different refractive indexes are combined to form a laminate, an adhesive material having an intermediate refractive index is preferably used for the purpose of diminishing reflection loss and for other purposes.

In order for a retardation film to be advantageously used for phase difference compensation to prevent coloring of liquid crystal cells, thereby attaining black-and-white display, the retardation film should satisfy the equation: $100 \text{ nm} < (n_x - n_y)d < 1,000 \text{ nm}$, wherein d is the thickness of the plate, i.e., should produce a phase difference of from 100 to 1,000 nm.

Figure 3:
FIG. 3 is a sectional view of one embodiment of the elliptically polarizing plate according to the present invention.

The elliptically polarizing plate according to the present invention comprises a laminate of the above-described retardation film with a polarizing plate. One example (5) of the elliptically polarizing plate is shown in FIG. 3, in which numeral 4 denotes a polarizing plate, 2 an adhesive layer, and 3 a retardation film. In the elliptically polarizing plate shown in FIG. 3, one of the adhesive layers 2 which is made of a pressure-sensitive adhesive has been provided on the outside of the retardation film 3 in order that the elliptically polarizing plate be bonded to a liquid crystal cell or the like.

As the polarizing plate for use in the above elliptically polarizing plate, a suitable polarizing plate can be used without any particular limitation. In general, however, there is used a polarizing film obtained by a method in which a film made of a hydrophilic polymer, such as poly(vinyl alcohol), is treated with a dichromatic dye, such as iodine, and the resulting film is then stretched or a method in which a plastic film such as a poly(vinyl chloride) film is treated to orient the polyene. Further, a polarizing plate obtained by sealing the above polarizing film may also be used.

Bonding of the retardation film 3 to the polarizing plate 4 can be accomplished in a suitable manner. It is, however, preferred that from the standpoint of compensation effect, the two plates be bonded so that the phase first of the retardation film becomes parallel to the absorption axis of the polarizing plate. For the bonding, a suitable adhesive material may be used. For example, the same adhesive or pressure-sensitive adhesive as described hereinabove with respect to the laminating of a birefringent film with other film(s) may be used.

Figure 4:
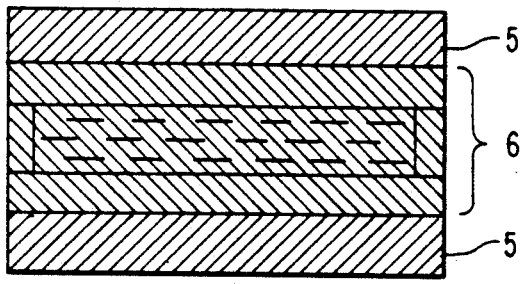
FIG. 4 is a sectional view of one embodiment of the liquid crystal display according to the present invention.
Figure 5:
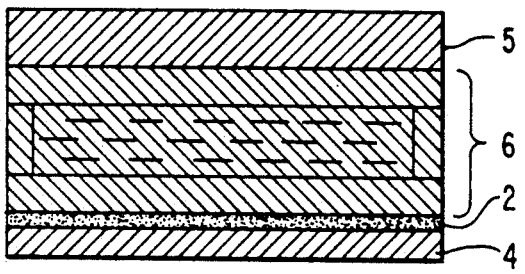
FIG. 5 is a sectional view of another embodiment of the liquid crystal display according to the present invention.

The liquid crystal display according to the present invention comprises a liquid crystal cell and a polarizing plate disposed on one or both sides of the liquid crystal cell through the above-described retardation film. In fabricating the liquid crystal display, the polarizing plate and retardation film are preferably used after being laminated with each other to form an elliptically polarizing plate as described above. Examples of the liquid crystal display are shown in FIGS. 4 and 5, in which numeral 5 denotes an elliptically polarizing plate and 6 a liquid crystal cell. The liquid crystal display shown in FIG. 4 has two retardation films disposed on both sides of the liquid crystal cell, while that in FIG. 5 has only one retardation film disposed on one side of the liquid crystal cell.

It is preferred that the retardation film employed in the liquid crystal display be one which compensates phase differences due to the liquid crystal cell over a wide range of viewing angles. By use of such a retardation film, coloring can be prevented over a wide viewing angle range. The liquid crystal cell to be used is not particularly limited. For example, it may be of the active matrix drive type represented by thin film transistor liquid crystal cells or of the passive matrix drive type represented by twisted nematic or super twisted nematic liquid crystal cells.

As described above, according to the present invention, birefringent films which each has a large refractive index difference and which vary in refractive index can be obtained. A large-sized birefringent film can also be easily produced from a resin selected from a variety of resins. Further, a retardation film showing only little phase difference change with changing viewing angle can be obtained. Furthermore, by use of the retardation film, a black-and-white display which is prevented from coloring over a wide viewing angle range and has excellent contrast is attained and a liquid crystal display having excellent visibility and recognizability can be obtained.

The present invention will be explained below in more detail by reference to the following examples, but the invention is not construed as being limited thereto.

EXAMPLE 1

A polycarbonate film having a thickness of 50 μm was laminated on one side with a biaxially stretched polyester film through an acrylic pressure-sensitive adhesive of the weakly tacky type (the type the adhesion strength of which increases to a slight degree upon heating). The resulting laminate was monoaxially stretched by 15% at 160° C., and the biaxially stretched polyester film was then peeled off, thereby obtaining a birefringent film.

EXAMPLE 2

A birefringent film was obtained in the same manner as in Example 1 except that the laminate to be stretched was prepared by laminating the same polycarbonate film on both sides with the same biaxially stretched polyester film.

EXAMPLE 3

A polystyrene film having a thickness of 70 μm was laminated on both sides with a biaxially stretched polypropylene film through an acrylic pressure-sensitive adhesive of the weakly tacky type. The resulting laminate was monoaxially stretched by 50% at 100° C., and the biaxially stretched polypropylene film was then peeled off, thereby obtaining a birefringent film.

EXAMPLE 4

A poly(vinyl alcohol) film having a thickness of 80 μm was laminated on both sides with a biaxially stretched polystyrene film through an acrylic pressure-sensitive adhesive of the weakly tacky type. The resulting laminate was monoaxially stretched by 80% at 115° C., and the biaxially stretched polystyrene film was then peeled off, thereby obtaining a birefringent film.

EXAMPLE 5

A cellulose acetate film having a thickness of 50 μm was laminated on both sides with a biaxially stretched polystyrene film through an acrylic pressure-sensitive adhesive of the weakly tacky type. The resulting laminate was monoaxially stretched by 100% at 120° C., and the biaxially stretched polystyrene film was then peeled off, thereby obtaining a birefringent film.

EXAMPLE 6

A polyester film having a thickness of 35 μm was laminated on both sides with a biaxially stretched polypropylene film through an acrylic pressure-sensitive adhesive of the weakly tacky type. The resulting laminate was monoaxially stretched by 20% at 150° C., and the biaxially stretched polypropylene film was then peeled off, thereby obtaining a birefringent film.

EXAMPLE 7

A polyarylate film having a thickness of 50 μm was laminated on both sides with a biaxially stretched polyamide film through an acrylic pressure-sensitive adhesive of the weakly tacky type. The resulting laminate was monoaxially stretched by 10% at 160° C., and the biaxially stretched polyamide film was then peeled off, thereby obtaining a birefringent film.

EXAMPLE 8

A polyimide film having a thickness of 50 μm was laminated on both sides with a biaxially stretched polyester film through an acrylic pressure-sensitive adhesive of the weakly tacky type. The resulting laminate was monoaxially stretched by 10% at 160° C., and the biaxially stretched polyester film was then peeled off, thereby obtaining a birefringent film.

COMPARATIVE EXAMPLE 1

A polycarbonate film having a thickness of 50 μm was monoaxially stretched by 15% at 160° C., thereby obtaining a birefringent film.

COMPARATIVE EXAMPLE 2

A birefringent film was obtained in the same manner as in Example 1 except that an unstretched polyester film was used in place of the biaxially stretched polyester film.

COMPARATIVE EXAMPLE 3

A polystyrene film having a thickness of 80 μm was monoaxially stretched by 40% at 120° C., thereby obtaining a birefringent film.

Each of the birefringent films obtained in the above Examples 1 to 8 and Comparative Examples 1 to 3 had been formed so that the phase difference within the film plane $[(n_x-n_y)d]$ was 400 nm (wavelength 633 nm). The values of $n_x$, $n_y$, $n_z$, and $N_z$ for each birefringent film are shown in Table 1, in which the stretch-direction refractive indexes for Example 3 and Comparative Example 3 are indicated by $n_y$ and those for the other examples are indicated by $n_x$.

TABLE 1

|  | $n_x$ | $n_y$ | $n_z$ | $N_z$ |
|---|---|---|---|---|
| Example 1 | 1.589 | 1.581 | 1.585 | 0.5 |
| Example 2 | 1.588 | 1.580 | 1.587 | 0.1 |
| Example 3 | 1.594 | 1.588 | 1.589 | 0.8 |
| Example 4 | 1.502 | 1.497 | 1.501 | 0.2 |
| Example 5 | 1.504 | 1.496 | 1.501 | 0.3 |
| Example 6 | 1.606 | 1.595 | 1.599 | 0.6 |
| Example 7 | 1.595 | 1.587 | 1.589 | 0.7 |
| Example 8 | 1.705 | 1.696 | 1.698 | 0.8 |
| Comparative Example 1 | 1.591 | 1.583 | 1.582 | 1.1 |
| Comparative Example 2 | 1.591 | 1.583 | 1.582 | 1.1 |
| Comparative Example 3 | 1.592 | 1.587 | 1.592 | 0 |

EVALUATION

Phase Difference Change

Each of the birefringent films obtained in Examples 1 to 6 and Comparative Examples 1 to 3 was used as it was as a retardation film and subjected to a phase difference measurement, in which the retardation film was inclined at 45 degrees based on the slow axis or first axis. In the case of the horizontal position (inclination 0 degree), the phase difference was 400 nm as described before.

The results obtained are shown in Table 2.

TABLE 2

|  | Slow axis direction (nm) | First axis direction (nm) |
|---|---|---|
| Example 1 | 402 | 402 |
| Example 2 | 436 | 370 |
| Example 3 | 391 | 453 |
| Example 4 | 433 | 373 |
| Example 5 | 423 | 383 |
| Example 6 | 392 | 410 |
| Comparative Example 1 | 346 | 458 |
| Comparative Example 2 | 346 | 458 |
| Comparative Example 3 | 446 | 359 |

Table 2 shows that in the case of the retardation film of Example 1 in which $N_z$ is 0.5, the phase difference is almost constant (about 400 nm) even when the retardation film is viewed at any angle within an inclination range up to 45 degrees.

Viewing Angle

Each of the retardation films obtained in Examples 1 to 6 and Comparative Examples 1 to 3 was laminated with a poly(vinyl alcohol)-based polarizing plate, thereby preparing elliptically polarizing plates. Each elliptically polarizing plate was bonded to both sides of an STN-type liquid crystal cell to prepare a display, which was subjected to a viewing angle test. In this test, the viewing angle range in which no coloring was observed and the contrast ratio was 10:1 or higher was measured with respect to both the horizontal direction and the vertical direction.

The results obtained are shown in Table 3.

TABLE 3

|  | Horizontal direction (degree) | Vertical direction (deqree) |
|---|---|---|
| Example 1 | 50–50 | 40–30 |
| Example 2 | 60–60 | 40–40 |
| Example 3 | 50–50 | 30–30 |
| Example 4 | 60–60 | 40–40 |
| Example 5 | 60–60 | 40–40 |
| Example 6 | 50–60 | 40–30 |
| Comparative Example 1 | 40–40 | 30–20 |
| Comparative Example 2 | 40–40 | 30–20 |
| Comparative Example 3 | 25–25 | 40–40 |

While the invention has been described in detail and with reference to specific embodiments thereof, it will be apparent to one skilled in the art that various changes and modifications can be made therein without departing from the spirit and scope thereof.

What is claimed is:

1. A birefringent film formed of a single resin in which molecules oriented in a direction parallel to the film plane and molecules oriented in the direction of the thickness of the film are present in a mixed state, which birefringent film has refractive indexes, $n_x$ and $n_y$, in two directions parallel to the film plane and crossing each other at right angles and a refractive index, $n_z$, in the direction of the thickness of the film, wherein $n_x > n_z > n_y$.

2. A birefringent film as claimed in claim 1, wherein the film is made of a resin which is positively birefringent.

3. A birefringent film as claimed in claim 2, wherein the resin which is positively birefringent is a polycarbonate, poly(vinyl alcohol), cellulose acetate, polyester, polyacrylate, polyimide or polyolefin.

4. A birefringent film as claimed in claim 1, wherein the film is made of a resin which is negatively birefringent.

5. A birefringent film as claimed in claim 4, wherein the resin which is negatively birefringent is polystyrene, a styrene-based copolymer, poly(methyl methacrylate) or a methyl methacrylate-based copolymer.

6. A retardation film which uses at least one birefringent film as claimed in claim 1 and has refractive indexes, $n_x$ and $n_y$, in two directions parallel to the film plane and crossing each other at right angles and a refractive index, $n_z$, in the direction of the thickness of the film, said refractive indexes $n_x$, $n_y$, and $n_z$ satisfying the following equation:

$$0 < (n_x - n_z)/(n_x - n_y) < 1$$

provided that $n_x > n_y$.

7. A retardation film as claimed in claim 6, wherein said refractive indexes $n_x$ and $n_y$ satisfy the following equation:

$$100 \text{ nm} < (n_x - n_y)d < 1,000 \text{ nm}$$

wherein d is the thickness of the plate.

8. An elliptically polarizing plate comprising a laminate of the retardation film as claimed in claim 6 with a polarizing plate.

9. A liquid crystal display comprising a liquid crystal cell and a polarizing plate disposed at least on one side of said liquid crystal cell through the retardation film as claimed in claim 6.

10. A process for producing a birefringent film, which process comprises laminating a resin film on one or both sides thereof with a shrinkable film, thereby preparing a laminate, and then heat stretching the laminate, thereby performing stretching treatment of the resin film while imparting to the resin film the ability to shrink in the direction crossing the stretching direction in which molecules oriented in a direction parallel to the film plane and molecules oriented in the direction of the thickness of the film are present in a mixed state.

11. A process as claimed in claim 10, wherein the degree of width-direction or lengthwise direction shrinkage of the shrinkable film is higher by at least 5% than that of the resin film.

* * * * *